B. I. LUNDSTROM.
PACKAGE CARRIER.
APPLICATION FILED FEB. 26, 1920.
1,365,518.
Patented Jan. 11, 1921.
2 SHEETS—SHEET 2.
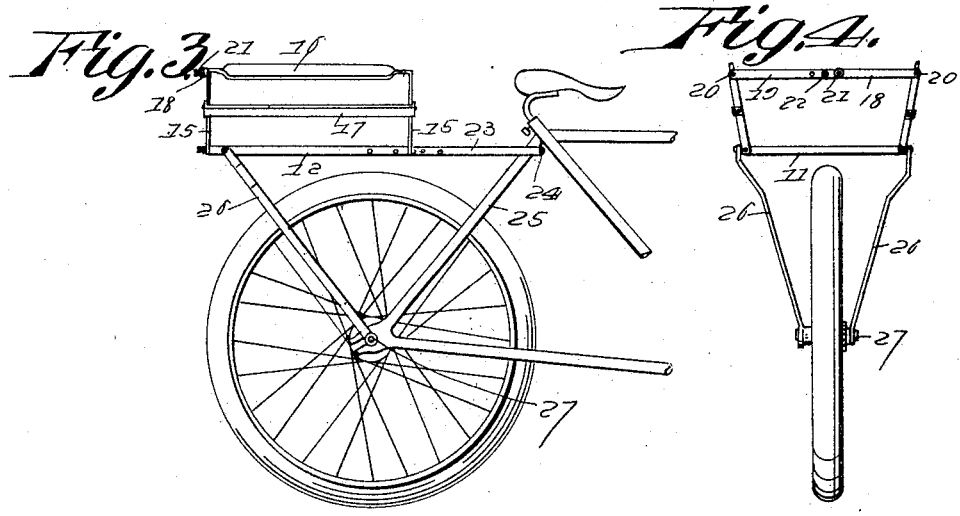
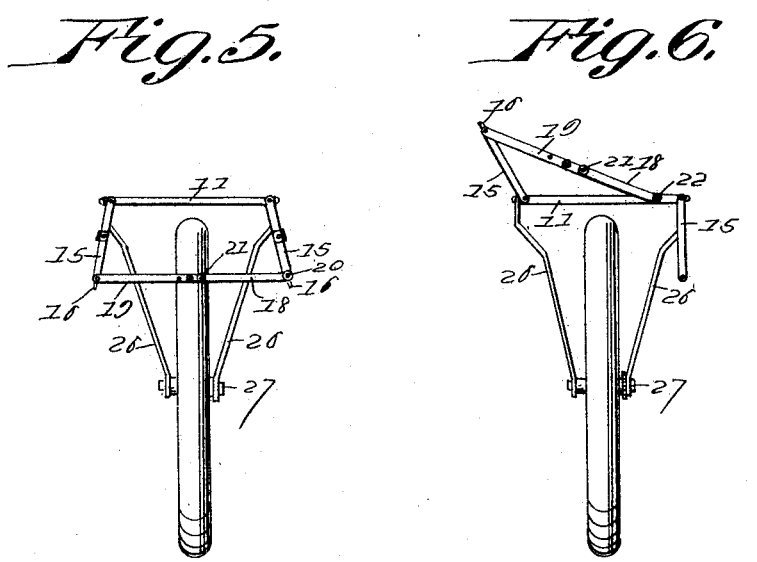
Inventor
Berger I. Lundstrom,
By
G. Hume Talbert
Attorney

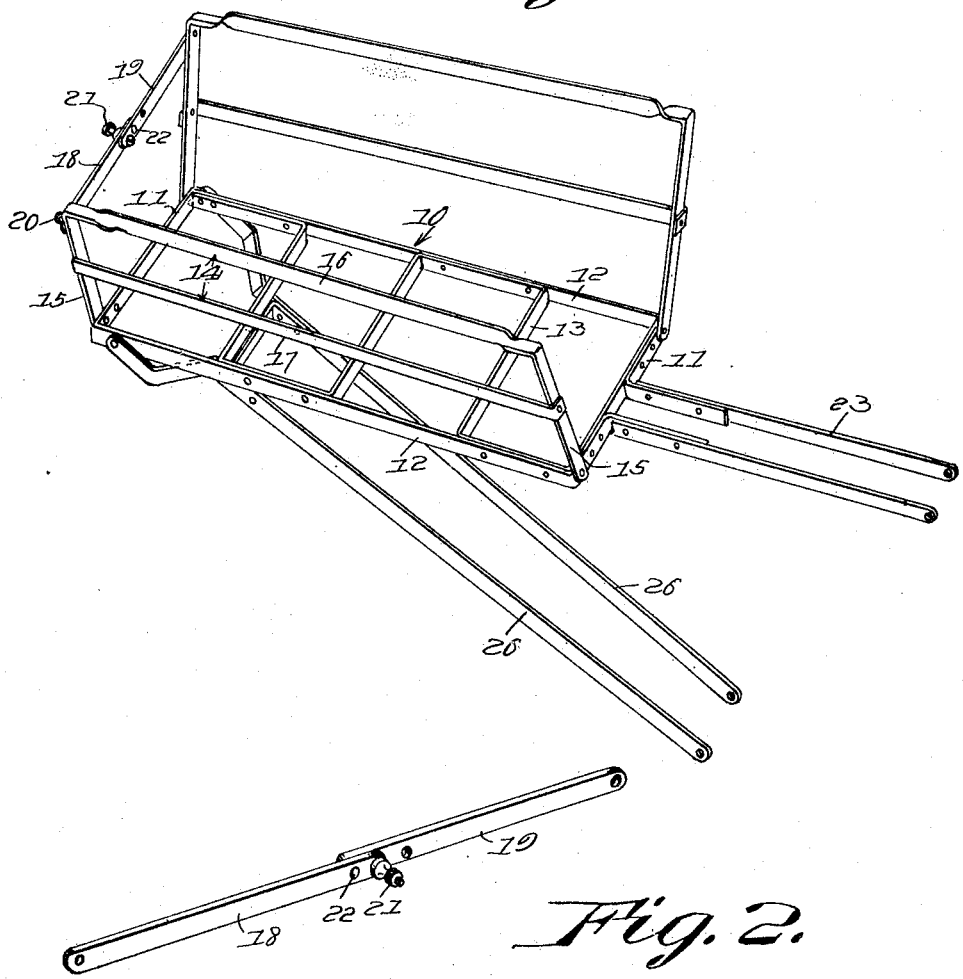

UNITED STATES PATENT OFFICE.

BERGER I. LUNDSTROM, OF LITTLE FALLS, NEW YORK.

PACKAGE-CARRIER.

1,365,518.　　　Specification of Letters Patent.　　Patented Jan. 11, 1921.

Application filed February 26, 1920. Serial No. 361,512.

*To all whom it may concern:*

Be it known that I, BERGER I. LUNDSTROM, a citizen of the United States of America, residing at Little Falls, in the county of Herkimer and State of New York, have invented new and useful Improvements in Package-Carriers, of which the following is a specification.

The object of the invention is to provide a simple, relatively inexpensive and convenient attachment for use in connection with bicycles, motorcycles, and similar vehicles, to perform the function of a package, bundle, valise or receptacle-carrier, and also as an auxiliary or supplemental seat for a rider, the construction of the same being such as to adapt it to be applied and moved without modification of the construction of the vehicle, and with this object in view the invention consists in a construction and combination of parts of which a preferred embodiment is shown in the accompanying drawings, wherein:

Figure 1 is a perspective view of the carrier detached.

Fig. 2 is a detail view of the stay bar.

Fig. 3 is a side view of the attachment applied in the operative position to a vehicle of the bicycle type.

Fig. 4 is a rear view of the same.

Figs. 5 and 6 are respectively rear views of the device in different adjustments from that shown in Fig. 4 and adapted respectively to serve as a carrier for large receptacles or an auxiliary seat for a rider.

The device consists essentially of a base 10 in the form of an open-work frame having end bars 11, side bars 12 and cross bars 13, side frames or wings 14 consisting of end bars 15 and longitudinal marginal and filler bars 16 and 17, and a stay bar 18 occupying normally a position transverse to the carrier for connecting the wings 14 either to hold the same in the substantially upright position indicated in Figs. 1 and 4 or in the pendent position shown in Fig. 5. Said stay bar is preferably intermediately jointed as indicated at 19 with the elements thereof respectively pivoted as at 20 to the side frames or wings, and the joint consisting of a bolt 21 or its equivalent adapted for engagement with either of the openings 22 of which there is a series to provide for holding the side frames or wings in the desired positions with relation to the plane of the base or bottom frame 10.

Said jointed stay bar is also detachably connected at one end with the adjacent side frame or wing to permit of disengaging the latter to permit it to assume a pendent position as indicated in Fig. 6 with the stay bar terminally connected with the base frame at 22 to form a side arm for the device when used as an auxiliary or supplemental seat for the vehicle.

The means of attachment of the device to the vehicle consists of the longitudinal draw bars 23 adapted to be connected at their forward ends by a transverse clamping bolt 24 in engagement with the rear braces 25 of the vehicle frame, and brace bars 26 extending from the axle bolt 27 of the rear wheel, or any other convenient portion of the frame of the vehicle to the rear ends of the side bars of the bottom or base frame 10.

In the transportation of small packages the arrangement of the device as shown in Figs. 1 and 4 is most convenient in that it provides a suitable retainer which, however, is readily accessible for the removal of the packages as, for example, in connection with a delivery messenger service. When a larger package such as a valise or even a trunk is to be carried the side rings may be released and dropped to the pendent position indicated in Fig. 5 so that the receptacle to be carried may be strapped upon the base or bottom frame in overhanging relation thereto. When the device is to serve as an auxiliary side seat for the vehicle the released side wall or frame may be dropped to the pendent position indicated in Fig. 6 while the opposite side wall is held in a convenient position by means of the stay bar 18 to form a back rest for the occupant of the seat.

What is claimed is:

1. A carrier for vehicles of the bicycle and motorcycle type having a base or bottom frame provided with means for attachment to the vehicle, side wings pivotally mounted upon the base or bottom frame for arrangement either above or below the plane thereof, and an intermediately jointed stay bar having terminal pivotal connection respectively with said wings, one end of said stay bar being interchangeably engageable with the corresponding wing and the base or bottom frame.

2. A carrier for vehicles of the bicycle and motorcycle type having a base or bottom frame provided with means for attachment to the vehicle, side wings pivotally mounted upon the base or bottom frame for arrangement either above or below the plane thereof, and an intermediately jointed stay bar having terminal pivotal connection respectively with said wings, one end of said stay bar being interchangeably engageable with the corresponding wing and the base or bottom frame, the intermediate joint of said stay bar being adjustable to vary the length of said bar.

In testimony whereof I affix my signature.

BERGER I. LUNDSTROM.